United States Patent

Okamura et al.

[11] Patent Number: 5,507,444
[45] Date of Patent: Apr. 16, 1996

[54] TAPE CASSETTE WITH IMPROVED SPRING FOR LOCKING PLATE

[75] Inventors: Masatoshi Okamura, Saku; Hiroshi Kaneda, Nagano, both of Japan

[73] Assignee: TDK Corporation, Tokyo, Japan

[21] Appl. No.: 280,093

[22] Filed: Jul. 25, 1994

[30] Foreign Application Priority Data

Jul. 30, 1993 [JP] Japan .................... 5-206937

[51] Int. Cl.⁶ .................................. G11B 23/087
[52] U.S. Cl. ........................................ 242/347.1
[58] Field of Search .................... 242/347, 347.1; 360/132; 206/389, 391, 403, 409; 267/141, 153, 161

[56] References Cited

U.S. PATENT DOCUMENTS

| | | | |
|---|---|---|---|
| 4,187,998 | 2/1980 | Okamura et al. | 242/347.1 |
| 4,212,437 | 7/1980 | Shiba et al. | 242/347.1 |
| 4,323,207 | 4/1982 | Gebeke | 206/389 |
| 4,466,583 | 8/1984 | Giannis et al. | 242/347.1 |
| 4,475,700 | 10/1984 | MacLeod, Jr. et al. | 242/347.1 |
| 4,712,150 | 12/1987 | Pertzsch et al. | 360/132 |
| 4,723,179 | 2/1988 | Posso | 206/389 |
| 4,744,530 | 5/1988 | Cybulski | 242/347.1 |
| 4,875,640 | 10/1989 | Mizutani | 242/347.1 |
| 4,899,242 | 2/1990 | Hashizume et al. | 360/132 |
| 4,915,322 | 4/1990 | Schoettle et al. | 242/347.1 |
| 4,928,197 | 5/1990 | Park et al. | 360/132 |
| 4,930,821 | 6/1990 | Jang | 242/347.1 |
| 5,002,239 | 3/1991 | Schoettle et al. | 242/347.1 |
| 5,011,096 | 4/1991 | Nagai et al. | 242/347.1 |
| 5,050,029 | 9/1991 | Inose et al. | 360/132 |
| 5,158,244 | 10/1992 | Gelardi et al. | 242/347.1 |
| 5,335,876 | 8/1994 | Yasufuku et al. | 360/132 |

FOREIGN PATENT DOCUMENTS

| | | | |
|---|---|---|---|
| 57-15263 | 1/1982 | Japan | 360/132 |
| 58-62877 | 4/1983 | Japan | 360/132 |
| 59-14955 | 5/1984 | Japan . | |
| 59-35903 | 10/1984 | Japan . | |
| 61-123047 | 6/1986 | Japan | 360/132 |

*Primary Examiner*—John P. Darling
*Attorney, Agent, or Firm*—Panitch Schwarze Jacobs & Nadel

[57] ABSTRACT

A tape cassette is provided which includes a cassette body composed of an upper case and a lower case between which a tape wound on a pair of hubs is housed, and a front cover or lid pivotally mounted on a front end of the cassette body, a locking plate for locking said front cover and a resilient member for biasing said locking plate toward a position to lock the front cover, characterized in that the resilient member is in the form of a ring-form spring. The ring-form spring is simple in construction and easy to produce and assemble.

9 Claims, 6 Drawing Sheets

TAPE CASSETTE WITH IMPROVED SPRING FOR LOCKING PLATE

BACKGROUND OF THE INVENTION

1. Technical Field of the Invention

The present invention relates to a tape cassette, and more particularly, to a resilient member for biasing a locking plate which is used to lock a front cover of such a tape cassette.

2. Prior Art

In general, a tape cassette 1 for containing a video or audio tape or a cleaning tape is, as shown in FIG. 1, composed of an upper ease 2, a lower ease 3 and a front cover or lid 4 pivotally mounted at its lateral plates to lateral sides of the front of the cassette 1 for protecting the tape exposed to the air at the front end of the cassette.

Usually, the front cover 4 doses the front end of the cassette as shown in FIG. 1 when the tape cassette is removed from a video deck or a tape recorder. Referring to FIGS. 3–6 which are enlarged views of the portion A of FIG. 1 as applied to the conventional tape cassette, FIG. 3 is an enlarged plane view of the lower ease, FIG. 4 is a cross sectional view taken along the line IV—IV of FIG. 3, FIG. 5 is a spring used in the conventional cassette and FIG. 6 is a left side view of the cassette. As shown, a locking paw 6 supported by a locking plate 7 engages a recess (not shown) formed on the inner face of one of the lateral plates of the front cover 4 so as to lock the front cover 4 to protect the tape 11. The locking plate 7 is held in this cover closure position under the resilience force of a torsion spring 8 to prevent the front cover 4 from free movement.

On the other hand, when the tape cassette 1 is inserted into a video recorder, the front cover 4 is pivoted and opened in such manner that the tape may be withdrawn as shown in FIG. 2. This is done by pushing a lock release projection 5 of the locking plate 7 by means of a pushing member (not shown) of the recorder in the direction indicated by an arrow C as shown in FIG. 4 against the resilience force of the torsion spring 8 to rock it to the position indicated by broken lines so as to disengage the locking paw 6 from the recess of the lateral plate of the front cover 4 and then the front cover 4 is swinged to the open position shown in FIG. 2.

The spring member 8 is, as shown in FIG. 5, consists of a coiled base portion 8a and a pair of legs 8b and 8c extending straight from this coiled base portion 8a. The coiled base portion 8a is fit on a spring retaining projection 7a of the locking plate 7, one leg 8b is engaged with the surface 7b of the locking plate 7 and the other leg 8c is engaged with a wall 9 of a locking plate housing portion 10 of the lower case 3.

However, the assemblage of the locking plate 7 and the torsion spring 8 into the cassette case is troublesome because it is required to first mount the coiled base portion 8a of the torsion spring 8 on the spring retaining projection 7a of the locking plate 7 and then insert this assembly into position in the cassette.

On the other hand, a V-shaped plate spring was proposed wherein one leg of the spring engages the inner surface of the locking plate and the other leg engages with a wall portion of the lower case so as to normally bias the locking plate (Japanese Utility Model Kokoku No.59-14955). Although this type of spring can be easily assembled into the cassette case, it is not easy to manufacture it into an accurate shape. Moreover, the spring force increases to a large extent with the increase in the rocking angle of the locking plate which exerts an adverse effect on the smooth rocking of the locking plate.

OBJECT OF THE INVENTION

Accordingly, a principal object of the present invention is to overcome the above-mentioned drawbacks and make it easy to assemble the locking plate and the biasing spring to lower the cost for the spring, automate and simplify the assembling work.

Another object of the present invention is to provide a tape cassette including a cassette body and a front cover or lid pivotally mounted to the cassette body for covering front end of the cassette body where a tape is exposed, a locking plate for locking the front cover and a resilient member for biasing the locking plate to a locking position, wherein the above-mentioned drawbacks are overcome and assemblage of the locking plate and the biasing spring into a cassette body is made easy to lower the cost for the spring, automate and simplify the assembling work, and the spring force is uniform for wide range of rocking angle of the locking plate.

BRIEF SUMMARY OF THE PRESENT INVENTION

According to the present invention, a tape cassette is provided which includes a cassette body composed of an upper case and a lower case between which a tape wound on a pair of reels is housed, and a front cover or lid pivotally mounted on a front end of the cassette body, a locking plate for locking said front cover and a resilient member for biasing said locking plate toward a position to lock the front cover, characterized in that the resilient member is in the form of a ring prior to insertion or assemblage into the cassette.

With this construction, the above-mentioned drawbacks are overcome and it is made easy to assemble the locking plate and the biasing spring into a cassette body to lower the cost for the spring, automate and simplify the assembling work, and the spring force is uniform for wide range of rocking angle of the locking plate.

DETAILED EXPLANATION OF THE PREFERRED EMBODIMENTS

According to the present invention, a tape cassette is provided which includes a cassette body composed of an upper case and a lower case between which a tape wound on a pair of hubs is housed, and a front cover or lid pivotally mounted on a front end of the cassette body, a locking plate for locking said front cover and a resilient member for biasing said locking plate toward a position to lock the front cover, characterized in that the resilient member is in the form of a ring before insertion or assemblage in the cassette.

The locking plate and an upright wall of the cassette body are provided with oppositely disposed retainers each having a substantially vertical slot for retaining the ring-form spring in position.

The slots of the retainers are preferably have a width approximately equal to or slightly narrower than the diameter of the spring so as to stably hold the spring in position.

The ring-form spring may be made of a resilient material such as stainless steel, iron steel, polypropylene, fluorinated rubber, silicone rubber, nitrile rubber, or urethane rubber.

Preferably, the ring-form spring is formed from a stainless steel wire or piano wire spring material of a uniform diameter.

The ring-form spring may be formed into an elliptical form but circular form is the most preferred in light of the easiness of manufacture.

The outer diameter of this circular wire is slightly larger than the distance between the retainers on the locking plate and the case, so that the spring force is normally exerted on the locking plate and the spring is self-retained under the spring force in position.

To prevent the ring-form spring from being displaced upwardly from the right position due to the fact that, when the locking plate is pushed by a pushing member on the side of the tape recorder, the locking plate is swung to a slanted position to generate a vertically upward component of force against the ring-form spring, the upper case may be provided with a lug or member for restricting this upward displacement.

DESCRIPTION OF PREFERRED EMBODIMENT

A few non-restrictive embodiments of the present invention will now be explained in making reference to the attached drawings. It should be understood that although the present invention will be described with respect to a video tape cassette the present invention is also applicable to other tape cassette such as audio or cleaning tape cassette of similar construction.

Figure 1:
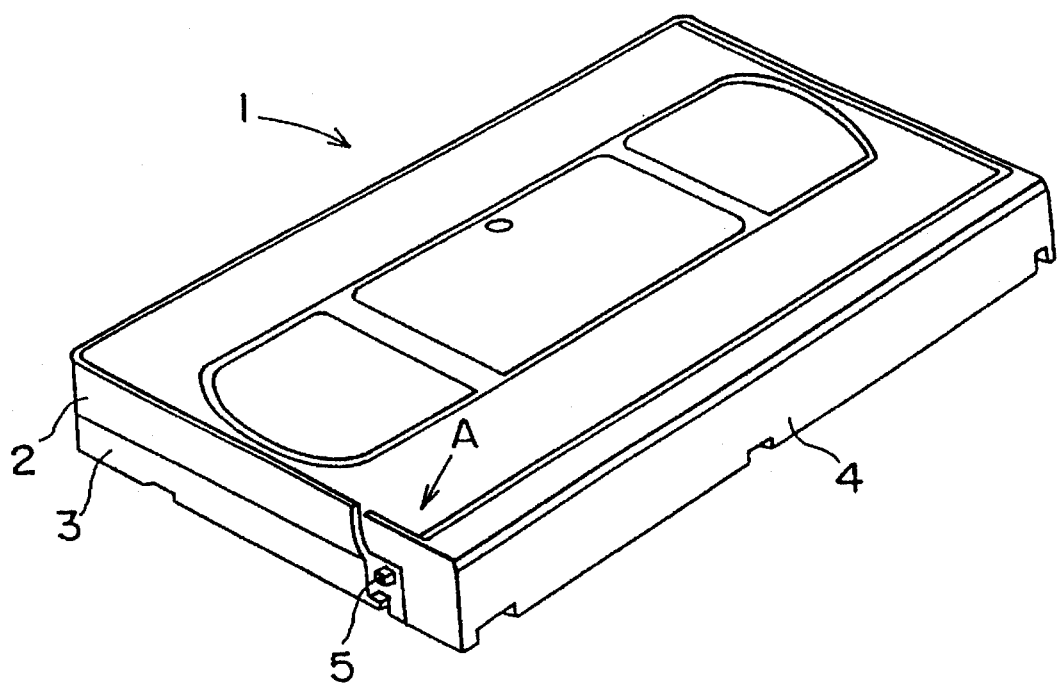
FIG. 1 is a perspective view of a tape cassette common to the present invention and the conventional technique.
Figure 2:
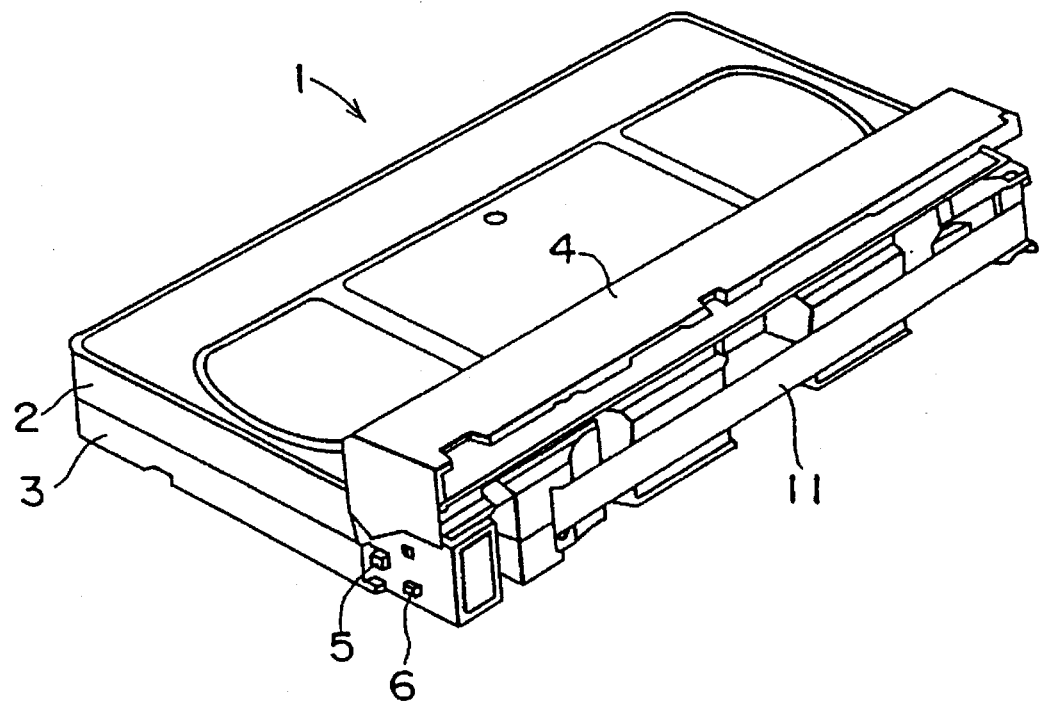
FIG. 2 is a perspective view of a video tape cassette common to the present invention and the conventional technique when the cassette is inserted into a video tape deck.

As the video tape cassette according to the present invention is similar to the conventional one illustrated in FIGS. 1 and 2 except for the locking mechanism in the inside of the portion indicated by the arrow A, the reference numerals 1, 2, 3, 4, 11 used in FIGS. 1 and 2 will be used in the embodiment, too.

Figure 3:
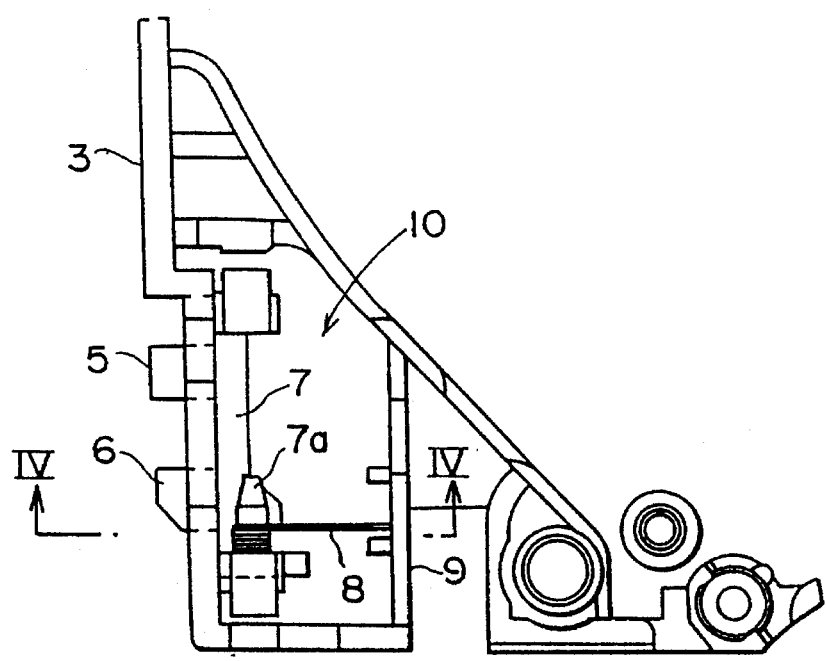
FIG. 3 is a plane view of a portion indicated by an arrow A of FIG. 1 of a conventional tape cassette.
Figure 4:
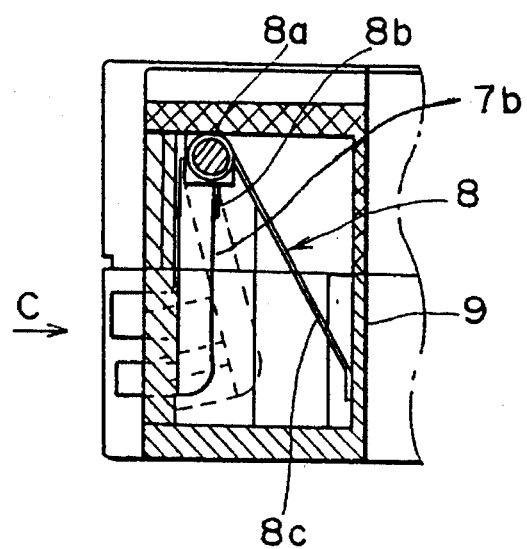
FIG. 4 is an elevational cross section taken along the line IV—IV of FIG. 3.
Figure 5:
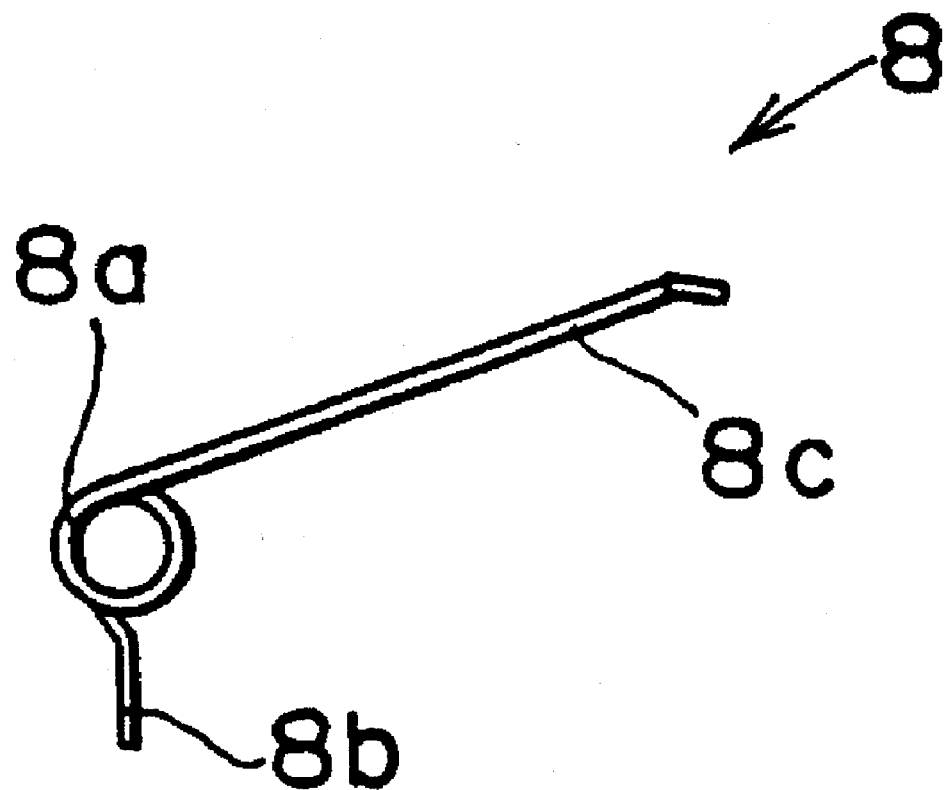
FIG. 5 is a view showing a conventional spring.
Figure 6:
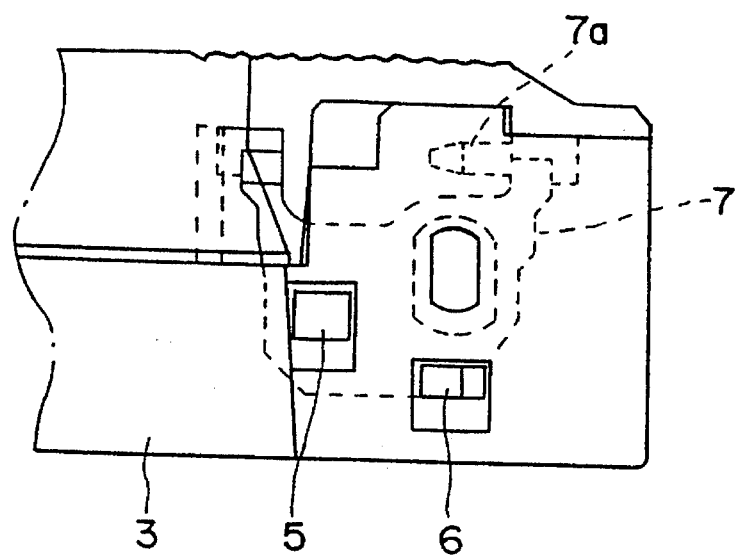
FIG. 6 is a side elevational view of the portion indicated by an arrow A of FIG. 1 of a tape cassette according to the prior art.

Referring to FIGS. 7–10, a tape cassette according to the present invention includes a cassette body composed of an upper case 2 and a lower case 3 assembled together and a pair of rotatable hubs having a magnetic tape 11 wound thereabout is housed in the hollow space formed by the upper and the lower cases. Further, a front cover 4 covering a open front end of the cassette body where the magnetic tape is withdrawn to the outside is pivotally mounted to the cassette body. Usually, the front end of the cassette body comprised of the upper case 2 and the lower case 3 is closed by this front cover 4. A locking mechanism for locking this front cover 4 is in the inside of the portion A of FIG. 1 as in the case of the conventional cassette shown in FIG. 3.

Figure 7:
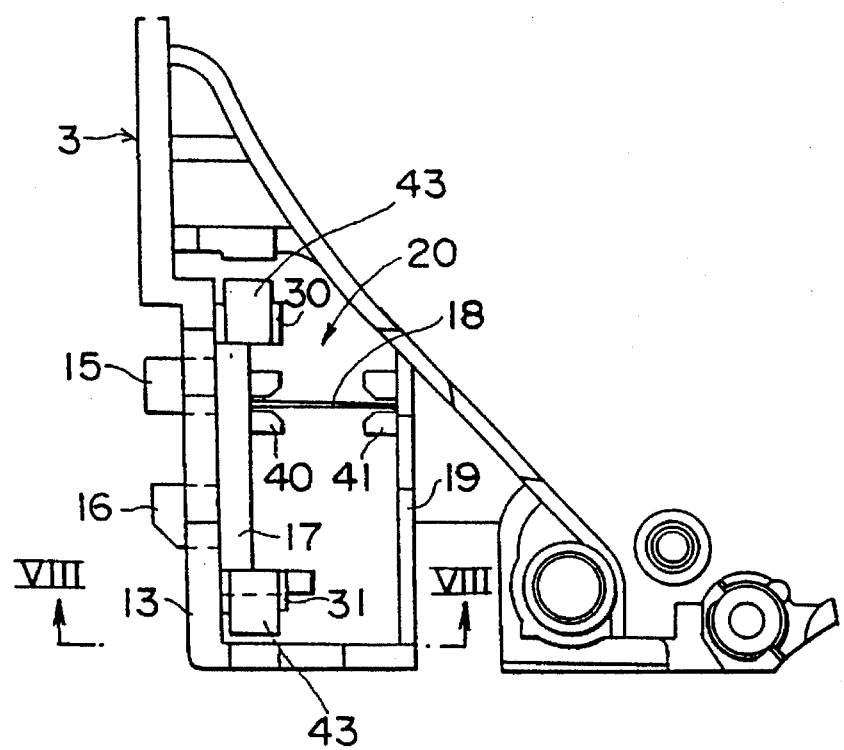
FIG. 7 is a plane view of a portion indicated by an arrow A of FIG. 1 according to the present invention.

FIG. 7 is an enlarged plane view a portion indicated by an arrow A of FIG. 1 of a tape cassette according to the present invention. As will be readily understood by comparing FIG. 7 with FIG. 3 of the conventional cassette, the torsion spring having a coiled base portion 8a is replaced by a ring-form spring 18 shown in FIG. 9. Correspondingly, a locking plate 17 does not include any member corresponding to the spring retaining projection 7a. Instead, spring retainers 40 and 41 are oppositely provided on the respective walls of the locking plate 17 and the upright wall 19 of the lower case, each having a substantially vertical slot for retaining the ring-form spring 18. This improved construction of the spring member and the related structure are the characteristic composition for the achievement of the object of the present invention.

In the inside of the portion A of FIG. 1, namely the front left portion of the lower case 3 shown in FIG. 7, a space 20 for housing the locking plate 17 and the ring-form spring member 18 is provided.

The locking plate 17 is provided with axes 43, 43 pivotally supported by bearings on a front supporting wall 30 and rear supporting wall 31 in the housing space 20. The locking plate 17 has a locking paw 16 and a lock release projection 15 on the side of the lateral wall of the lower case 3. When the tape cassette 1 is not in use, removed from the video deck or recorder, the locking paw 16 and the lock release projection 15 project through the lateral wall 13 by way of through holes (FIG. 10) outwardly and the lock release projection 15 is directly exposed to the air to wait for a pushing while the locking paw 16 engages the recess (not shown) formed on the inner surface of one of the side plates of the front cover 4 to lock the front cover 4.

On the other hand, when the tape cassette 1 is inserted into a video deck (not shown), a pushing member on the side of the deck will engage the lock release projection 15 toward the direction indicated by an arrow C' (FIG. 8) to rotate the integral locking plate 17 against the spring force of the ring-form spring member 18. As a result, the front cover 4 is made free and means on the side of the video deck (not shown) rotates and opens the front cover 4. The positional relation between the locking plate 17 and the ring-form spring member 18 and their shapes are as indicated by broken lines in FIG. 8.

Provided on the other face of the locking plate 17 is a retainer 40 having a vertical slot for retaining the ring-formed spring member. Similarly, mounted on the opposite surface of the upright wall 19 is a retainer 41 for retaining the ring-form spring member 18 to restrict its movement. The width of the slots or grooves is approximately the same as or a slightly smaller than the diameter of the spring member.

Figure 8:
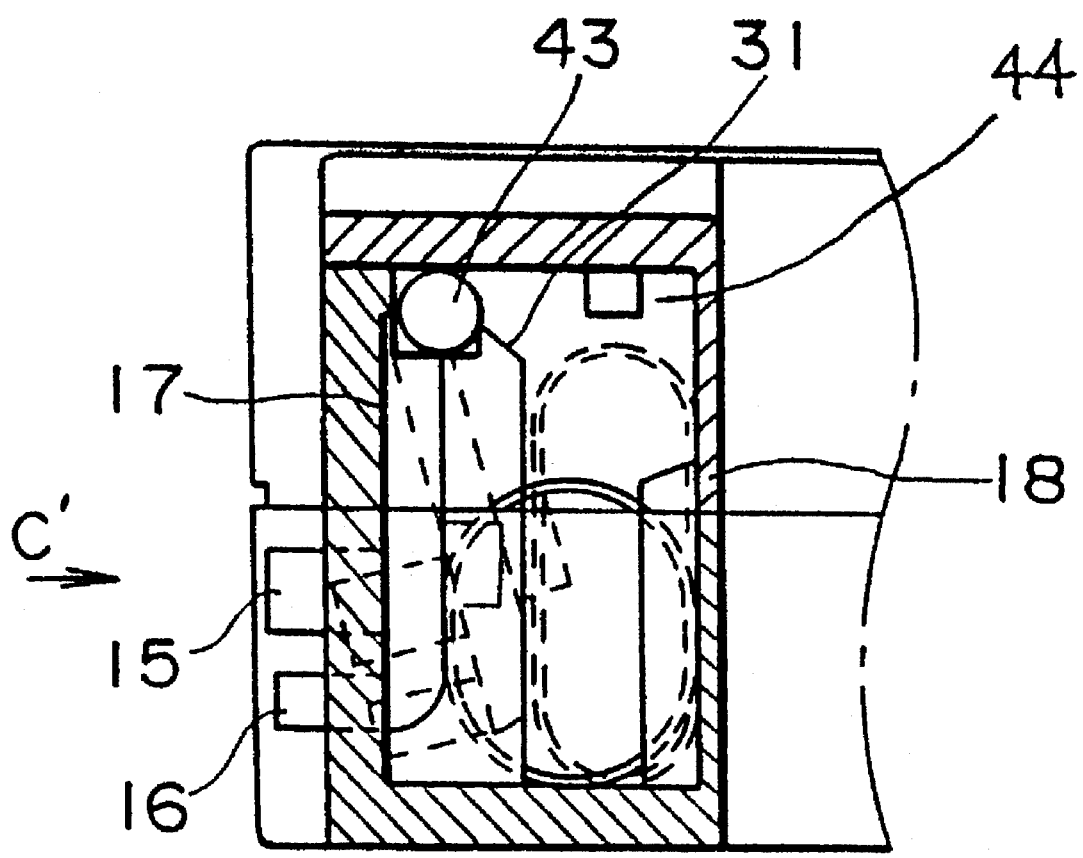
FIG. 8 is an elevational cross section taken along the line VIII—VIII of FIG. 7.

Insertion of this ring-form spring member 18 is effected by pushing the spring into the slots of the retainers 40 and 41 downwardly by which the spring is slightly elliptically deformed to exert a spring force to the locking plate as shown in FIG. 8. Accordingly, the spring is retained in position and is not dislodged even when the cassette is turned up-side-down during assemblage of the cassette because of this elliptical deformation.

Figure 9:
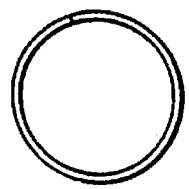
FIG. 9 is a view showing a spring according to the present invention.
Figure 10:
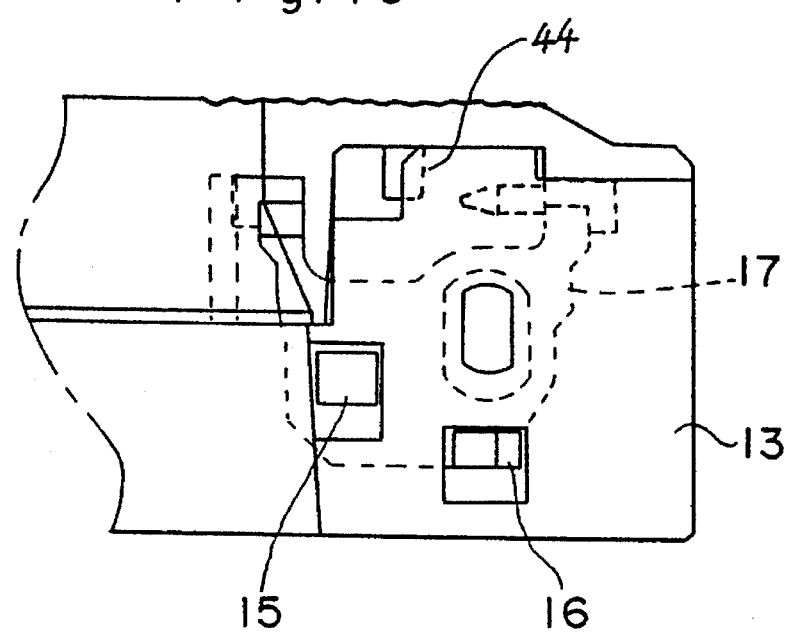
FIG. 10 is a side elevational view of the portion indicated by an arrow A of FIG. 1 according to the present invention.

As shown in FIG. 9, the ring-form spring is preferably made from a length of wire spring steel of uniform diameter which makes it possible to reduce the material and working cost unlike the conventional plate springs because a precise control of the size and shape is not required. When a thin wire spring of a uniform diameter is formed into a circle, the spring force exerted on the locking plate does not very much vary in the range of rocking of the locking plate.

As shown in FIG. 8, the upper case 2 is provided with a lug or member 44 for restricting the upward displacement of the ring-form spring. The lower end of this lug 44 is normally clear of the spring to allow the deformation of the spring for all possible angle of the locking plate. This displacement is caused due to the fact that, when the locking plate 17 is pushed by a pushing member(not shown) on the side of a tape recorder, the locking plate is swung to a slanted position to generate a vertically upward component of force.

According to the present invention, the ring-formed spring member 18 can be easily assembled into the space 20 of the cassette body and accordingly the present invention is conducive to automated assemblage, simplification of the assembling process and productivity.

Although the present invention was explained in relation to a few preferred embodiments, it should be understood that the present invention may have various variations and modifications without departing from the spirit of the present invention. For example, the present invention is applicable to a cleaning tape cassette for video tape.

What is claimed is:

1. A tape cassette including a cassette body composed of an upper case and a lower case between which a tape wound on a pair of hubs is housed, a front cover pivotally mounted on a front end of the cassette body, a locking plate for locking said front cover and a resilient member for biasing said locking plate toward a position to lock the front cover, characterized in that the resilient member is in the form of a ring-form spring.

2. A tape cassette according to claim 1, wherein said locking plate is provided with a first retainer having a first substantially vertical slot, an upright wall of the cassette body is provided in a position opposite to said locking plate, a second retainer formed on the upright wall in an opposite position to said first retainer and having a second substantially vertical slot, and said ring-form spring is in the form of a circle prior to insertion into the first and second slots and in elliptically deformed form when inserted into the first and second slots.

3. A tape cassette according to claim 2, wherein said ring-form spring is formed from a wire spring material of a uniform diameter and the width of each slot is substantially the same as or a slightly smaller than the diameter of the ring-form spring.

4. A tape cassette according to claim 3, wherein said wire spring material is selected from a group of spring steel, polypropylene, fluorinated rubber, silicone rubber, nitrile rubber, and urethane rubber.

5. A tape cassette according to claim 4, wherein said ring-form spring is formed from a spring steel wire having a uniform diameter.

6. A tape cassette according to claim 1, wherein said ring-form spring is formed from a wire spring material of a uniform diameter, and wherein said locking plate is provided with a first retainer having a first substantially vertical slot, an upright wall of the cassette body is provided in a position opposite to said locking plate, a second retainer formed on the upright wall in an opposite position to said first retainer and having a second substantially vertical slot, and the width of each slot is substantially the same as or slightly smaller than the diameter of the ring-form spring.

7. A tape cassette according to claim 6, wherein said wire spring material is selected from a group of spring steel, polypropylene, fluorinated rubber, silicone rubber, nitrile rubber, and urethane rubber.

8. A tape cassette according to claim 7, wherein said ring-form spring is formed from a spring steel wire having a uniform diameter.

9. A tape cassette according to claim 1, wherein said upper case is provided with a member for restricting upward displacement of said ring-form spring.

\* \* \* \* \*